United States Patent
Meeks

(10) Patent No.: US 6,199,734 B1
(45) Date of Patent: Mar. 13, 2001

(54) ARCHERY BOWHOLDER

(76) Inventor: Paul H. Meeks, 602 Kimbrough Dr., Tallulah, LA (US) 71282

(*) Notice: Subject to any disclaimer, the term of this patent is extended or adjusted under 35 U.S.C. 154(b) by 0 days.

(21) Appl. No.: 09/359,525

(22) Filed: Jul. 23, 1999

(51) Int. Cl.$^7$ ................................... B60R 9/08
(52) U.S. Cl. .................. 224/401; 224/546; 224/553; 224/570; 224/571; 224/916; 248/316.5
(58) Field of Search ................... 224/401, 442, 224/545, 546, 548, 552, 555, 558, 567, 570, 571, 916, 533, 536, 537, 553; 248/519, 316.3, 316.5; 383/4, 72, 75, 43

(56) References Cited

U.S. PATENT DOCUMENTS

| | | | |
|---|---|---|---|
| 492,740 | * | 2/1893 | Copeland .............................. 224/442 |
| 1,691,155 | * | 11/1928 | Howell ................................ 248/316.5 |
| 1,701,419 | * | 2/1929 | Peden ............................ 248/316.5 X |
| 2,248,170 | * | 7/1941 | Hansen .............................. 224/546 X |
| 2,637,474 | * | 5/1953 | Vincenzo ......................... 224/546 X |
| 3,295,732 | * | 1/1967 | Haven .............................. 224/916 X |
| 3,443,730 | * | 5/1969 | Meusel ................................ 224/536 |
| 4,339,064 | | 7/1982 | Ziaylek, Jr. . |
| 4,607,772 | * | 8/1986 | Hancock ............................. 224/442 |
| 4,823,673 | * | 4/1989 | Dowining ........................ 224/401 X |
| 4,826,057 | | 5/1989 | Yamada . |
| 4,915,273 | * | 4/1990 | Allen ................................ 224/916 X |
| 5,186,585 | * | 2/1993 | Sousa et al. ..................... 224/401 X |
| 5,249,722 | | 10/1993 | Horn . |
| 5,303,427 | * | 4/1994 | Fishbaine ............................ 383/4 X |
| 5,595,333 | * | 1/1997 | Boston ................................ 224/536 |
| 5,641,106 | | 6/1997 | Slaughter et al. . |
| 5,697,181 | * | 12/1997 | Savant ............................... 224/401 X |
| 5,706,990 | | 1/1998 | Lahrson . |
| 5,791,610 | | 8/1998 | Sanchez . |
| 5,878,929 | | 3/1999 | Leonard . |
| 5,922,437 | * | 7/1999 | Bryant .............................. 150/155 X |
| 5,961,015 | * | 10/1999 | Shirakawa ............................ 224/442 |
| 5,975,389 | * | 11/1999 | Braun et al. ..................... 224/916 X |

FOREIGN PATENT DOCUMENTS

| | | | |
|---|---|---|---|
| 2257392 | * | 6/1974 | (DE) .................................... 224/570 |

* cited by examiner

Primary Examiner—Gregory M. Vidovich
(74) Attorney, Agent, or Firm—Akin, Gump, Strauss, Hauer & Feld, LLP

(57) ABSTRACT

A bowholder for supporting an archery bow on a fixed or movable structure, and particularly adapted for supporting an archery bow on a cargo carrier rack or the like of a motor vehicle, such as an all terrain vehicle (ATV), includes an elongated tubular frame member supported on spaced-apart support blocks which are mountable on a cargo carrier rack by releasable fastener assemblies. The frame member supports spaced-apart U-shaped bow limb support brackets which are mounted for pivotal movement on the frame member and are connected to pivot levers which, in turn, are connected to opposite ends of an elastically stretchable strap member. Opposite ends of the pivot levers form handles for rotating the U-shaped brackets against the bias of the elastic strap member to receive and release opposed limbs of an archery bow disposed in the U-shaped brackets, respectively. A fitted fabric cover includes an elastic hem and drawstrings for securing the cover tightly over the bowholder with a bow supported thereon.

17 Claims, 2 Drawing Sheets

ARCHERY BOWHOLDER

FIELD OF THE INVENTION

The present invention pertains to an archery bowholder which may be mounted on various structures including the cargo deck of a vehicle, such as an all terrain vehicle (ATV), and wherein the bowholder is characterized by opposed somewhat U-shaped rotatable support brackets for supporting and snubbing the opposed limbs of an archery bow.

BACKGROUND

Various types of archery bowholders have been developed including those adapted to be mounted on a motorized vehicle, such as an all terrain vehicle (ATV). However, certain desiderata in the art of archery bowholders have not been met by prior art devices, including the need to snugly retain an archery bow on the bowholder but in such a way which will permit convenient mounting of the bow on the bowholder and removal of the bow from the bowholder quickly and without risk of damage to the bow.

Other desiderata in the art of archery bowholders include the need to provide a bowholder which is adapted to support various bow sizes and configurations without requiring adjustment of the bowholder attachment points to the bow. Still further, there has been a desire to provide a bowholder which is readily adapted to mount on various fixed and movable structures, including the cargo deck or rack of a motor vehicle, particularly an ATV, and which is adapted to be supported on various cargo deck or cargo rack configurations. It is to meet the above-mentioned ends and needs in the art of bowholders, as well as others which are recognized by those skilled in the art, that the present invention has been developed.

SUMMARY OF THE INVENTION

The present invention provides an improved archery bowholder. The present invention also provides an archery bowholder adapted to mount on a vehicle and more particularly adapted to mount on a cargo carrier deck or rack of a motor vehicle, such as an ATV.

The present invention also provides an archery bowholder which is adapted to support an archery bow in a manner which provides for ease of mounting the archery bow on the bowholder and removing the bow quickly from the bowholder while minimizing risk of damage to the bow.

Still further in accordance with the present invention, an archery bowholder is provided which is adapted to support various sizes and configurations of archery bows without requiring adjustment to the bowholder itself.

In accordance with one aspect of the present invention, an archery bowholder is provided which is characterized by spaced apart somewhat U-shaped upstanding support brackets which are mounted on a support bar or frame member for pivotal movement and wherein the brackets are each resiliently biased into a position to snugly retain an archery bow supported thereon in such a way that the bow may be quickly and conveniently mounted on the bowholder and quickly and conveniently removed from the bowholder, when desired. The bowholder support brackets are advantageously interconnected by an elastic member connected to opposed bracket pivot arms, each pivot arm including a handle portion for rotating one or both of the support brackets to release gripping engagement with a bow retained in the bowholder.

Still further, the present invention provides an improved archery bowholder in combination with a flexible bow cover which is operable in a working position to cover the bowholder and a bow supported thereon and which is also operable to be quickly removed from its working position to allow access to and removal of an archery bow from the bowholder.

Those skilled in the art will further appreciate the above mentioned advantages and superior features of the present invention together with other important aspects thereof upon reading the detailed description which follows in conjunction with the drawing.

DETAILED DESCRIPTION OF A PREFERRED EMBODIMENT

Figure 1:
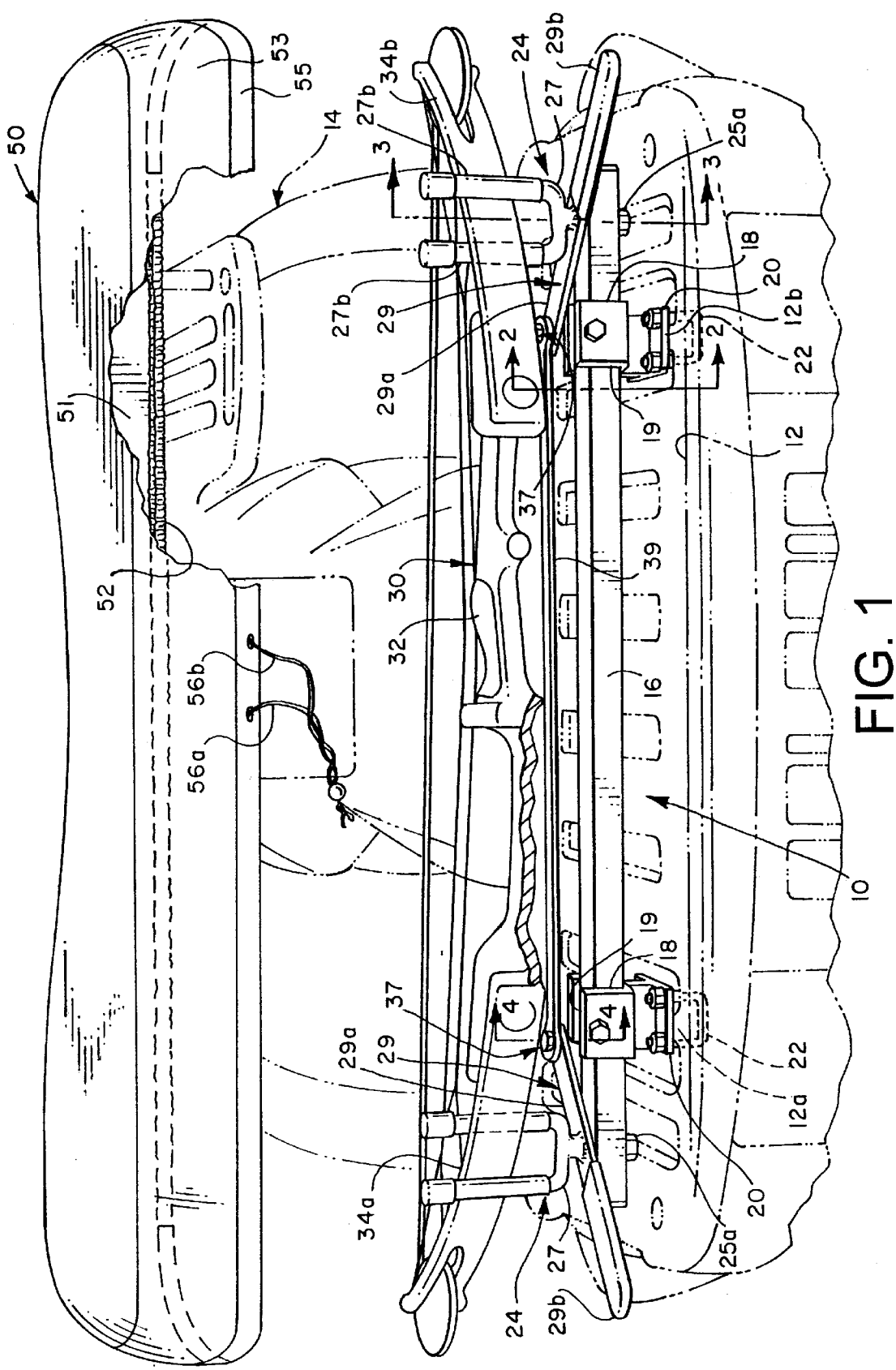
FIG. 1 is a perspective view of the archery bowholder of the present invention shown mounted, by way of example, on a cargo carrier rack of a motorized vehicle, such as an ATV.

In the description which follows like parts are marked throughout the specification and drawing with the same reference numerals, respectively. The drawing figures are not necessarily to scale and certain features may be shown exaggerated in scale or in generalized form in the interest of clarity and conciseness.

Referring to FIG. 1, there is illustrated an archery bowholder in accordance with the present invention and generally designated by the numeral 10. The bowholder 10 is shown mounted on a cargo carrier rack 12 of a motor vehicle, such as an ATV, generally designated by the numeral 14. The environment in which the bowholder 10 is shown and described is a particularly advantageous application of the bowholder. However, those skilled in the art will recognize that the bowholder 10 may be adapted to be mounted in other orientations and on other support structures, both fixed and movable.

Figure 2:
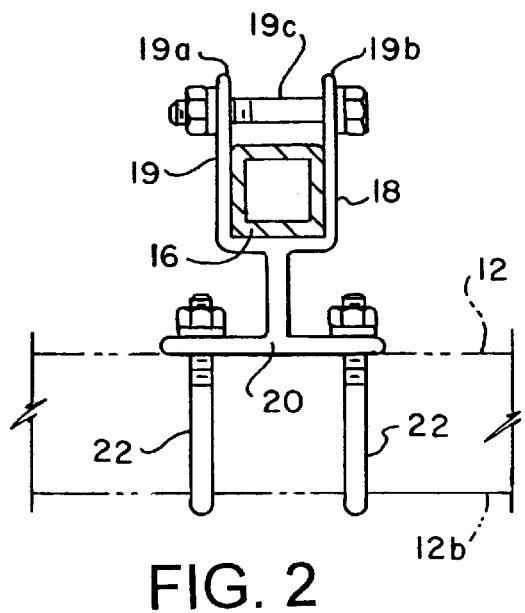
FIG. 2 is a section view taken generally along the line 2—2 of FIG. 1.

A preferred embodiment of the bowholder 10 includes an elongated frame or support member 16, preferably comprising a lightweight, metal, square cross section tube. The frame member 16 is adapted to be supported in spaced apart support blocks 18 and suitably clamped therein at selected positions of the frame member with respect to each of the support blocks. As shown in FIGS. 1 and 2, the support blocks 18 each include an upstanding channel-shaped portion 19 adapted to receive the frame member 16 therein. Opposed flanges 19a and 19b of each support block 18, FIG. 2, are operable to be forcibly clamped to the frame member 16 by a conventional machine bolt and nut assembly 19c, as shown. The frame support blocks 18 are also provided with flanged base parts 20 adapted to be mounted on the cargo carrier rack 12 and suitably secured thereto by respective sets of U-bolt and nut assemblies 22, see FIGS. 1 and 2. The support blocks 18 are, preferably, identical.

Figure 3:
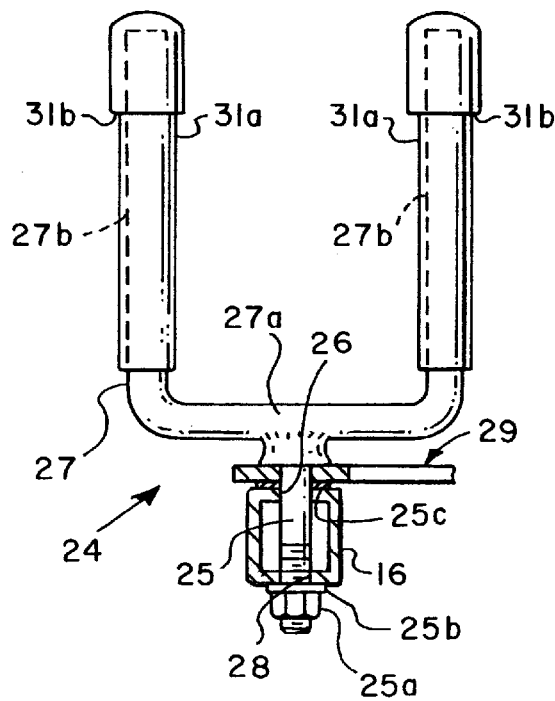
FIG. 3 is a section view taken generally along the line 3—3 of FIG. 1.

The elongated, substantially straight tube or bar type frame member 16 is adapted to support two spaced apart bow support brackets 24 which are preferably mounted outboard of the support blocks 18, respectively, and for pivotal movement on the frame member 16. As shown by way of example in FIG. 3, each of the brackets 24 includes a cylindrical pivot pin 25 supported for rotation in respective bores 26 and 28, FIG. 3, in the frame member 16. The pivot pin 25 is integrally formed with or joined to a somewhat U-shaped bow support member 27 at a base part 27a thereof. Pivot pin 25 and support member 27 are also joined for rotation with an elongated pivot lever member 29 to be described in further detail herein. The distal end of each pivot pin 25 is threaded for receiving a retaining nut 25a. Spaced apart self-lubricating bearing disks 25b and 25c are interposed the frame member 16, the nut 25a and the lever 29, respectively, as shown in FIG. 3, to provide ease of pivotal movement of the support brackets 24. The brackets 24 both include the above-described somewhat U-shaped bow support members 27 comprising base part 27a and opposed spaced apart and parallel extending tines 27b integrally joined to the base part 27a. The tines 27b are preferably provided with elastomeric cushioning members comprising tubular sleeves 31a which are sleeved over and suitably secured on the tines 27b, as shown in FIGS. 1 and 3. Sleeves 31a preferably include circumferential bow retention shoulders 31b formed thereon, respectively, as shown in FIG. 3.

Figure 4:
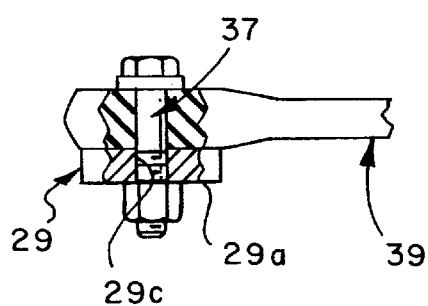
FIG. 4 is a section view taken generally along line 4—4 of FIG. 1.

As shown in FIG. 1, an archery bow 30 is shown by way of example supported by the bowholder 10. The bow 30 includes a handle 32 and opposed bow limbs 34a and 34b which are shown extending between the tines 27b of the brackets 24, respectively, and supported thereby in a standoff position from the base parts 27a of the support members 27. Each of the bow support brackets 24 is advantageously provided with one of the aforementioned lever members 29, suitably secured to a bracket base part 27a for rotation with the U-shaped bracket support member 27. Each lever member 29 includes a lever part 29a which extends from one side of the pivot pin 25 and a handle part 29b which extends from pivot pin 25 opposite the lever part 29a. Each lever part 29a is provided at its distal end with a bore 29c, see FIG. 4 by way of example, for receiving a machine screw and nut assembly 37 which is connected to one end of an elongated elastic member 39 extending between each of the pivot lever members 29 and connected thereto, respectively, as shown in FIG. 1. The elastic member 39 may be a molded elastomer strap which is stretchable and which has an elastic memory to return toward a relaxed position. The elastic member 39 may, for example, be molded of a suitable elastomer material. The elastic member 39 may be formed of other elastic materials and may, for example, be of a type of member known as a Bungee cord. The connection of the elastic member 39 at its opposite ends to each of the pivot levers 29, as shown in FIG. 1, biases the bowholder brackets 24 to rotate in opposite directions. Viewing FIG. 1, the left bracket 24 is biased to rotate in a clockwise direction while the right bracket 24 is biased to rotate in a counterclockwise direction. Other resilient biasing means may be operably connected to the brackets 24, if desired, to bias the brackets to rotate as described.

Accordingly, when a bow, such as the bow 30, FIG. 1, is mounted with its limbs 34a and 34b extending between the tines 27b of the respective bracket support members 27, the brackets 24 are biased to rotate to forcibly but releasably engage the bow limbs and retain the bow 30 supported therebetween, preferably in a standoff position from the base parts 27a of each of the brackets. However, the bow 30 may rest on the base parts 27a, if desired. By providing the pivot levers 29 with handle parts 29a, these handle parts may be grasped and rotated to stretch the elastic member 39 and relax gripping engagement of the bow limbs 34a and 34b by the respective brackets 24. In fact, with a bow mounted on the bowholder 10 only one of the pivot levers 29 need be grasped and rotated in a direction to further stretch the elastic member 39 thereby relaxing forcible engagement of one of the brackets 24 with respect to the associated bow limb 34a or 34b, whereupon the bow 30 may be quickly removed from the bowholder.

The bowholder 10 may be easily and quickly mounted on a front or rear carrier rack, such as the cargo carrier rack 12 of a vehicle, such as the ATV 14, by attaching the mounting blocks 18 to selected rack members 12a and 12b of the rack 12, for example, using the U-bolts 22. Frame member 16 may then be mounted on the mounting blocks 18 and suitably secured thereto in the manner described above and as illustrated in FIG. 2, in particular.

An archery bow, such as the bow 30, is easily mountable on the bowholder 10 by grasping the bow with the bow strings facing away from the bowholder 10, generally in the orientation shown in FIG. 1, and with the arrowrest shelf of the bow preferably facing upward, if the bowholder is mounted in a horizontal position, as shown. Viewing FIG. 1, the left limb 34a of the bow 30 is preferably placed between the tines 27b of the left bracket 24 and, while maintaining the bow substantially level, bow limb 34b is moved until it is generally aligned with the U-shaped support member 27 of the right bracket 24. While holding the bow 30 with the left hand, for example, the handle 29b of pivot lever 29 of the right bracket 24 is grasped and rotated in a clockwise direction to allow the right limb 34b of the bow 30 to be inserted between the tines 27b of the bracket support member 27.

Once the limb 34b is disposed between the tines 27b of the right bracket 24, the pivot lever 29 of that bracket may be released and the elastic member 39 will tend to rotate the respective brackets 24 in opposite directions. In so doing, the brackets 24 will snugly engage and support the bow 30 in the manner shown in FIG. 1. As previously described, the bow 30 may be quickly removed from the bowholder 10 by grasping one or the other of the pivot lever handles 29b and rotating the associated pivot lever member 29 to relax gripping engagement of the bow limb by the associated bracket member 24. The bow limb which has undergone relaxed engagement by its supporting bracket member may then be quickly removed from between the bracket tines 27b and the bow may then be quickly and conveniently removed from the other bracket 24 also.

Thanks to the configuration of the support members 27, including the opposed tines 27b and their elastomeric tubular sleeves 31a, the bow limbs 34a and 34b are not subject to any marring or other damage which might be caused by archery bowholders which are provided with mechanical clamps which can be forcibly adjusted and overtightened, for example. Moreover, the provision of the U-shaped support members 27 mounted for pivotal movement on the frame member 16 allows for the bowholder 10 to support various configurations of archery bows without requiring adjustment of the bowholder. Still further, the support brackets 24 may, if desired, be mounted at various locations along the frame member 16 by providing the frame member with spaced apart sets of pivot pin receiving bores corresponding to the pivot pin receiving bores 26 and 28 shown in FIG. 3. In this way, the bowholder 10 may be adapted to support even a wider variety of archery bows, if desired.

The various parts of the bowholder 10 described above may be manufactured of conventional engineering materials, such as lightweight non-corrosive metals, including aluminum. The lever handles 29b may be provided with elastomer or polymer coatings or sleeves thereon to provide a more pleasant feel and easy gripping action when grasped by a person's hand.

Referring further to FIG. 1, the bowholder 10 is also advantageously provided with a flexible fabric cover 50 which is preshaped to conform generally to the shape of an archery bow, such as the bow 30, but to also completely cover the bowholder and the bow when applied over a bowholder, as shown. The preshaped cover 50 includes a backpanel 51 having an elongated elastic strap section 52 formed as or suitably attached to a hem of the back panel. A shaped front panel 53 is provided with a hem 55 in which opposed drawstrings 56a and 56b are disposed and suitably attached to the cover at their distal ends, not shown, disposed in the hem 55 and adjacent the opposite ends of the elastic section 52. Accordingly, when the cover 50 is pulled over the bowholder 10 with a bow 30 mounted thereon, the drawstrings 56a and 56b may be pulled toward each other and tied under the bias of the elastic section 52 to suitably retain the cover on the bowholder 10 and covering both the bowholder and the bow 30 during storage and/or transport thereof. The cover 50 may be fabricated of multiple panels of a suitable water repellent material, such as treated and woven polyester or Nylon fabric. The cover 50 may also be printed with a suitable camouflage pattern, if desired.

The construction and operation of the bowholder 10 is believed to be readily understandable to those of ordinary skill in the art of bowholders from the foregoing description.

Although a preferred embodiment of the invention has been described in detail herein, those skilled in the art will recognize that various substitutions and modifications may be made without departing from the scope and spirit of the appended claims.

What is claimed is:

1. A bowholder for releasably supporting an archery bow having opposed bow limbs, said bowholder comprising:
   a frame member;
   a pair of spaced apart support brackets for engagement with a bow limb of an archery bow, respectively, each of said support brackets being supported for pivotal movement about respective pivot axes on said frame member; and
   an elongated elastic member having opposed ends operably connected to said each of said support brackets, respectively, for biasing said support brackets to respectively pivot into forcible engagement with said bow limbs of said bow.

2. The bowholder set forth in claim 1 wherein
   each of said support brackets comprises a bracket member having spaced apart tines for receiving a bow limb therebetween, respectively.

3. The bowholder set forth in claim 2 wherein:
   said tines of said support brackets include resilient cushioning members mounted thereon for engagement with said limbs of said bow, respectively.

4. The bowholder set forth in claim 1 wherein,
   said bowholder includes pivot levers connected to each of said support brackets for rotating said support brackets against the bias of said elastic member, respectively, to release forcible engagement of said support brackets with said bow.

5. The bowholder set forth in claim 4 wherein:
   said pivot levers include pivot arms extending from one side of said pivot axes, of said support brackets, respectively, and respective handle parts extending opposite said arms.

6. The bowholder set forth in claim 1 wherein:
   said frame member comprises an elongated tubular member.

7. The bowholder set forth in claim 1 including:
   a pair of support members for supporting said frame member.

8. The bowholder set forth in claim 7 wherein:
   said support members for supporting said frame member comprise spaced-apart support blocks including means for forcibly engaging said frame member and for adjusting the position of said frame member with respect to said support blocks, respectively.

9. The bowholder set forth in claim 8 wherein:
   said support blocks each include mounting members for releasably mounting said support blocks on a cargo carrier rack of a vehicle.

10. The bowholder set forth in claim 1 including:
    a flexible fabric cover including at least one panel for covering said bowholder and a bow mounted thereon, said cover including an elastic hem part along at least one side of said cover.

11. The bowholder set forth in claim 10 wherein:
    said cover includes a second hem part including opposed drawstrings for drawing said cover tightly over said bowholder and with a bow mounted thereon.

12. A bowholder for releasably supporting an archery bow having opposed bow limbs, said bowholder comprising:
    an elongated frame member;
    a pair of support brackets mounted on said frame member, respectively, at spaced apart points thereon, each of said support brackets being supported on said frame member for pivotal movement with respect to said frame member;
    respective pivot levers connected to each of said support brackets for rotating said support brackets with respect to said frame member; and
    an elongated elastic member connected at one end thereof to one of said support brackets and at another end thereof to the other of said support brackets for biasing said support brackets to respectively pivot into forcible engagement with said limbs of said bow, respectively.

13. The bowholder set forth in claim 12 including:
    spaced apart support members for supporting said frame member on a support structure.

14. A bowholder for releasably supporting an archery bow having opposed bow limbs, said bowholder comprising:
    an elongated frame member;
    a pair of spaced apart support members adapted to support said frame member on a cargo carrier rack of a vehicle;
    a pair of spaced apart upstanding U-shaped support brackets mounted on said frame member at spaced apart points thereon, respectively, and supported on said frame member for pivotal movement with respect to said frame member;
    resilient biasing means connected to each of said support brackets for biasing said support brackets to rotate in opposite directions with respect to said frame member; and
    opposed pivot lever members connected to each of said support brackets, respectively, for rotating each of said support brackets against the bias of said resilient biasing means to release forcible engagement of said support brackets with an archery bow disposed thereon.

15. The bowholder set forth in claim 14 wherein:

said pivot levers include respective pivot arms extending on one side of a pivot of said support brackets, respectively, and respective handle parts extending opposite said arms; and said resilient biasing means comprises an elongated, elastic member connected at opposite ends thereof to respective ones of said arms of said pivot levers.

16. A bowholder for releasably supporting an archery bow having opposed bow limbs, said bowholder comprising:

a pair of spaced apart support brackets for engagement with a bow limb of an archery bow, respectively, each of said support brackets being supported for pivotal movement;

resilient biasing means operably connected to said support brackets for biasing said support brackets to respectively pivot into forcible engagement with one of said bow limbs of said archery bow;

pivot levers connected to each of said support brackets for rotating said support brackets against the bias of said resilient biasing means, respectively, to release forcible engagement of said support brackets with said bow;

said pivot levers include pivot arms extending from one side of a pivot axis of said support brackets, respectively, and respective handle parts extending opposite said arms; and said resilient biasing means comprises an elongated elastic member connected at opposite ends to respective ones of said arms of said pivot levers.

17. A bowholder for releasably supporting an archery bow having opposed bow limbs, said bowholder comprising:

a frame member;

a pair of spaced apart support brackets, each said support bracket including a part adapted; for respective engagement with the opposed bow limbs of the archery bow, each of said support brackets being supported for pivotal movement about respective pivot axes on said frame member to forcibly engage a bow limb; and resilient biasing means connected to each of said support brackets for urging pivotal movement of said support brackets, respectively, in opposite directions with respect to each other for biasing said support brackets to respectively pivot into forcible engagement with said bow limbs while permitting movement of said support brackets, respectively, against the urging of said biasing means so as to enable the release of said bow from said bowholder.

* * * * *